April 3, 1962  J. C. GERARD  3,028,576
METHODS AND APPARATUS FOR MAKING THIN PLASTIC GLOVES
Filed June 2, 1958  3 Sheets-Sheet 1
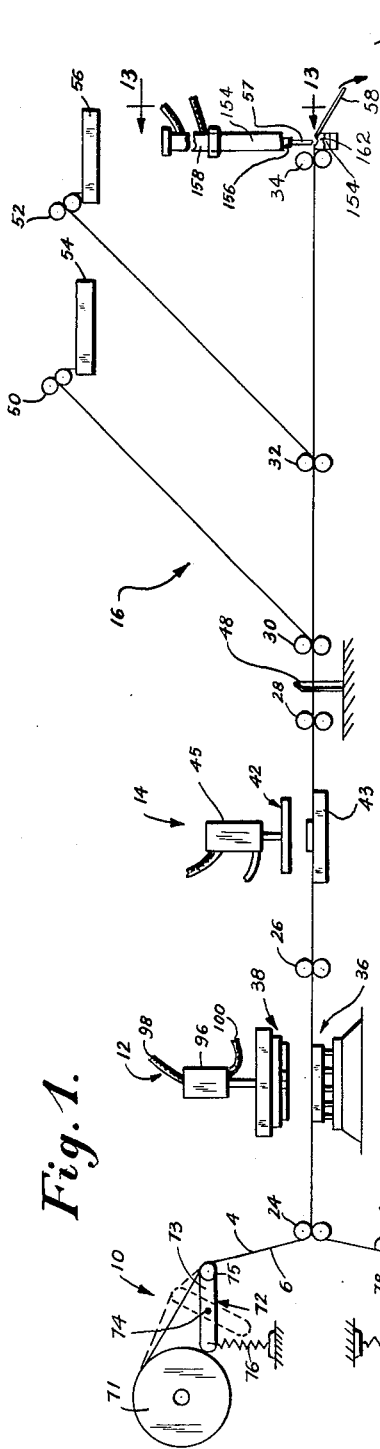
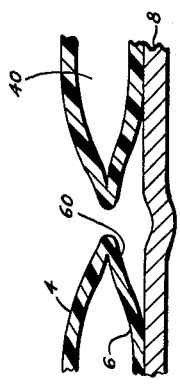
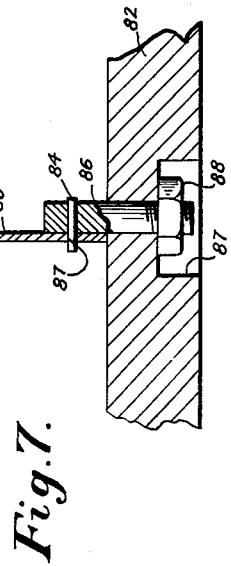
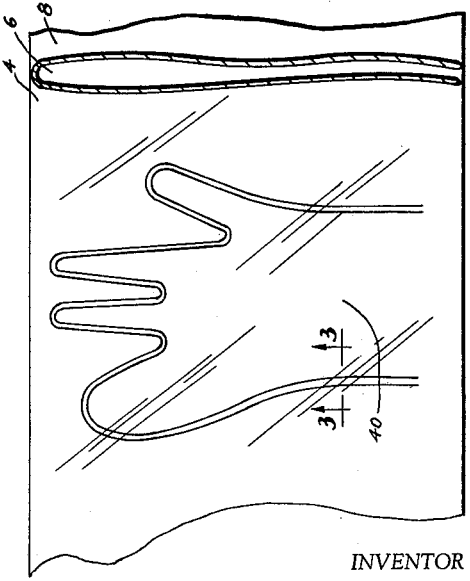
INVENTOR
JOSEPH C. GERARD
BY Cushman, Darby & Cushman
ATTORNEYS April 3, 1962  J. C. GERARD  3,028,576
METHODS AND APPARATUS FOR MAKING THIN PLASTIC GLOVES
Filed June 2, 1958  3 Sheets-Sheet 2
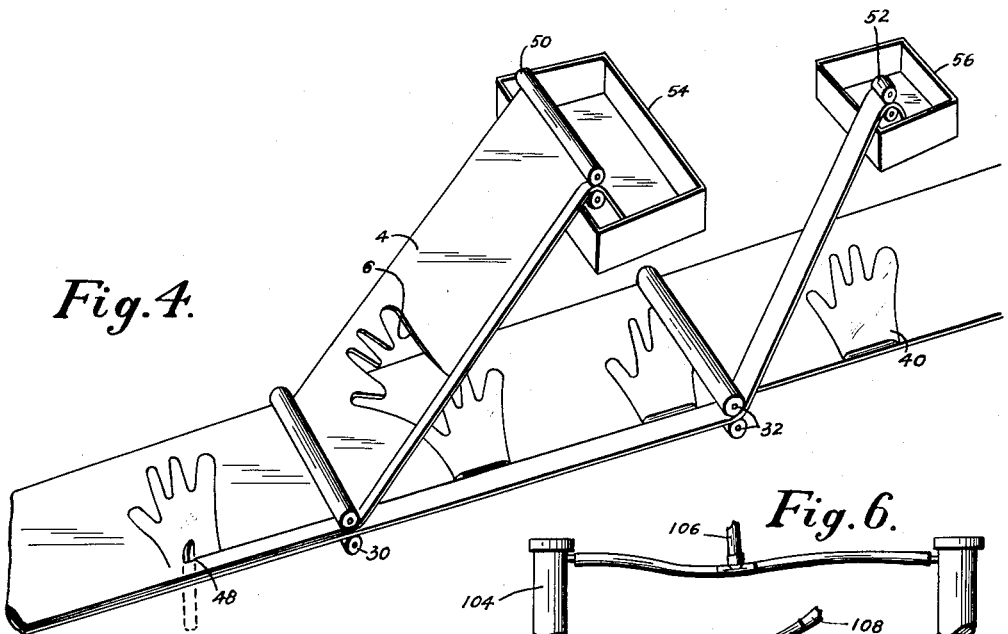
Fig.4.
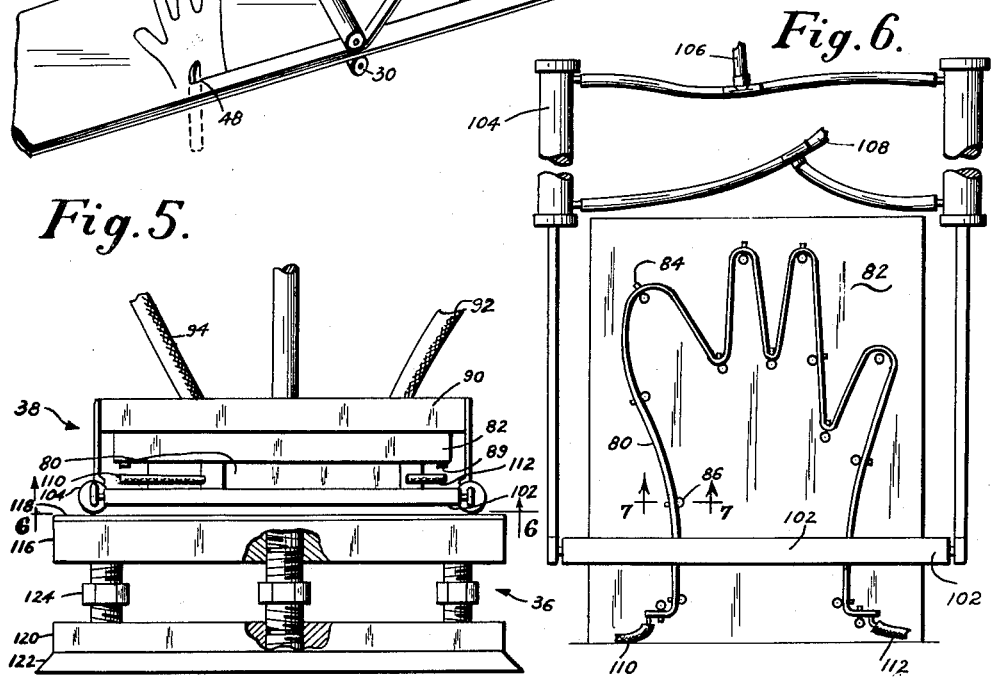
Fig.5.
Fig.6.
INVENTOR
JOSEPH C. GERARD
BY Cushman, Darby & Cushman
ATTORNEYS

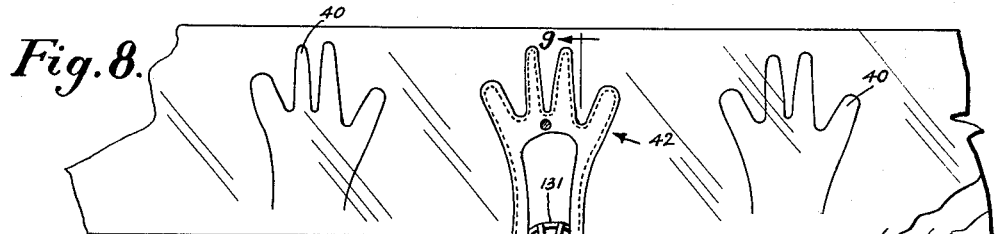
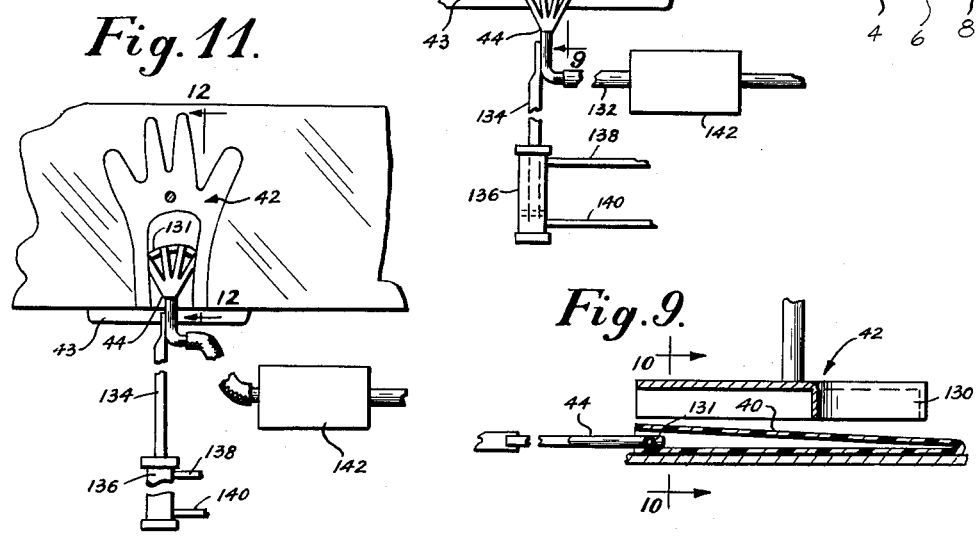
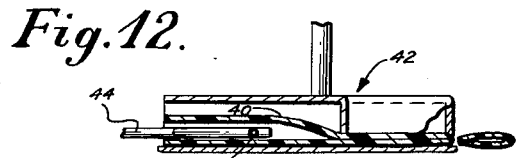
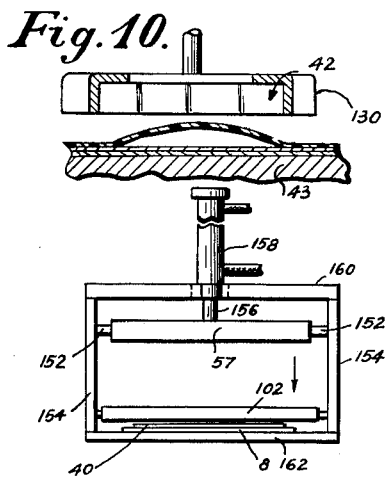
INVENTOR
JOSEPH C. GERARD
BY Lushman, Darby & Lushman
ATTORNEYS 3,028,576
METHODS AND APPARATUS FOR MAKING
THIN PLASTIC GLOVES
Joseph C. Gerard, Omaha, Nebr., assignor to Ethicon,
Inc., Somerville, N.J., a corporation of New Jersey
Filed June 2, 1958, Ser. No. 739,375
17 Claims. (Cl. 156—251)

This invention relates to methods and apparatus for manufacturing disposable medical examining gloves from thin plastic sheet material.

In the co-pending application of Scott, Serial No. 612,546, now Patent No. 2,847,676, there is disclosed a disposable medical examining glove which is formed from thin sheets of plastic material, such as polyethylene, which can be mass produced at such a low cost as to make it economically feasible for a physician to use each glove only once and then throw it away.

It will be evident that the provision of such a glove is a great convenience to physicians as it obviates the need for the unpleasant and time-consuming task of cleaning and sterilizing medical examining gloves between each use as is now the standard practice when rubber, or other, gloves are used.

The two most important characteristics of a medical examining glove are that it must be thin enough to provide sufficient tactile perception to the wearer so that he can readily determine the physical characteristics of the body orifice being examined, and that it must be sufficiently externally smooth to obviate the likelihood of the glove serving to irritate the tender tissues of the orifice being examined. Gloves formed of sheets of polyethylene, or some similar plastic sheet material, satisfy the first criterion but have heretofore been unable to satisfy the second because the presently known methods of making such gloves result in a product having a very pronounced external seam.

For example, in the patent to Nover, No. 2,773,264, relating to a glove formed of two sheets of plastic material which is constructed for use in handling foods, the sheets of plastic are joined at an extremely pronounced external seam. It will readily be seen that while such construction is undoubtedly quite satisfactory for plastic gloves which are to be put to ordinary use, the existence of such prominent seams, particularly in the finger portions of such gloves, makes them inherently unsatisfactory for use in the medical examination field. Moreover, and this is demonstrated in the above-mentioned Nover glove, the presently known methods of making such gloves necessitate the location of the seal between the sheets of plastic at a point located inwardly, a substantial distance, from the free edges of the respective sheets, and it therefore follows that an externally facing crevice is defined between the sheets. Such a crevice is highly undesirable in a medical examining glove as it greatly increases the likelihood of the gloves picking up and retaining contaminated or infected material which can subsequently fall off and contaminate the examining table or the floor of the examining room.

It is within the contemplation of this invention to provide methods and apparatus for mass producing plastic medical examining gloves at such a low cost as to be disposable after a single usage, but which, nevertheless, satisfy all the criteria of an acceptable medical examining glove. The methods and apparatus herein proposed can be utilized to produce a medical examining glove having an external seam which has a width in the area of $\frac{1}{100}$ of an inch and is, therefore, imperceptible for all practical purposes to which the glove is to be put. Moreover, the seal between the respective sheets of plastic extends to the free ends of the respective sheets of plastic so that no sharp edges are presented, and, perhaps even more important, there are no crevices between the sheets.

It is therefore an object of this invention to provide methods and apparatus for manufacturing, from two thin plastic sheets, a disposable medical examining glove having its edge portions joined together by a seal which does not appreciably protrude from the remainder of the finished glove.

It is another object of this invention to provide methods and apparatus for manufacturing, from two thin plastic sheets, a disposable medical examining glove having its edge portions joined together by a seal which extends to the free edges thereof.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and purview of the appended claims.

In the drawings:

FIGURE 1 is a side elevational view of the apparatus for producing medical examining gloves in accordance with this invention;

FIGURE 2 is a fragmentary plan view of the plastic and paper webs after the same have been subjected to the stamping operation;

FIGURE 3 is a vertical section taken along line 3—3 of FIGURE 2;

FIGURE 4 is a perspective view of the waste removal section, illustrating the slitting of the moving webs of plastic and paper and the apparatus for taking up the waste plastic film and the waste paper;

FIGURE 5 is a somewhat enlarged elevational view of the stamping section of the apparatus which forms the glove from a pair of contacting webs of plastic material;

FIGURE 6 is a bottom view of the cutting die of the stamping apparatus which is taken along line 6—6 of FIGURE 5;

FIGURE 7 is a sectional view taken along line 7—7 of FIGURE 6.

FIGURE 8 is a plan view, partially in section, of the glove lubricating section of the apparatus;

FIGURE 9 is a sectional view taken along line 9—9 of FIGURE 8;

FIGURE 10 is a sectional view taken along line 10—10 of FIGURE 9;

FIGURE 11 is a plan view, partially in section, of the glove lubricating section of the apparatus, with a plastic glove positioned directly thereunder and being held in position by the glove hold-down apparatus while the interior of the glove is being lubricated;

FIGURE 12 is a sectional view taken along line 12—12 of FIGURE 11; and

FIGURE 13 is a vertical section taken along line 13—13 of FIGURE 1 illustrating the web cutting section.

In this specification I will first outline the general features and operation of my method and apparatus, and will then discuss the details of the respective elements of the invention.

Referring to FIGURE 1, the machine comprising the invention may, for purposes of discussion, be regarded as having five separate stations, which may be functionally described as the feeding station 10, the stamping station 12, the lubricating station 14, the waste removal station 16, and the web-cutting station 18.

The apparatus of the feeding station 10 supplies two continuous webs, 4 and 6, of plastic material, together with one web 8 of paper, to the remainder of the machine. Each of these three webs has a width somewhat greater than the length (from wrist opening to finger tip) of the glove to be formed, and neither of the plastic webs is wider than the paper web. These three webs, which are vertically aligned with the paper on the bottom, are fed between a pair of transversely extending feed rollers 24 and then extend horizontally to, and through, other pairs of transversely extending feed rollers 26, 28, 30, 32 and 34 which are aligned with feed rollers 24. At least one roller of each pair of the above mentioned feed rollers is power-driven, and each of the power-driven rollers is mechanically, or otherwise, engaged with the others for synchronous rotation therewith.

As all of the power-driven rollers are of the same diameter, it will be seen that all portions of a continuous web extending through each of them will move at a uniform rate when the power-driven rollers are rotated. For reasons which will be clearly explained below, the power-driven rollers do not rotate continuously, but rather move intermittently for uniform periods, with each period of movement serving to advance the composite web of paper and plastic a distance which is at least slightly greater than the maximum width of the finished glove to be produced by the operation of the machine.

The stamping station 12 is located intermediate the pair of feed rollers 24 and the pair of feed rollers 26. Here the three horizontally disposed and vertically aligned webs pass over a backing plate assembly 36, which is located directly under a vertically moving cutting and sealing die assembly 38. When the composite web pauses in its intermittent advance, a heated die descends and cuts the two plastic sheets into the outline of the sides and fingers of the desired glove, with the fingers thereof pointing to a first edge of the aligned webs. As shown in FIGURE 2, the sides of the glove outlined do not extend to the second longitudinal edge of the webs, and the wrist opening of the glove is not formed by this operation, although it may be said to be defined by the ends of the cuts in the plastic which are nearest to the second longitudinal edge of the composite web. Stated otherwise, that portion of the plastic webs between a line defining the wrist opening of the glove and the second longitudinal edge of the webs remains imperforate. For purposes of discussion immediately hereinafter, we will speak of that portion of the plastic webs which is within the glove-like outline, formed by this cutting action, as being a glove 40 even though it is attached, at the area normally defined in a wrist opening, to the remainder of the plastic webs, and is not yet a true glove.

As the die of the cutting and sealing die assembly 38 cuts the plastic by its heat, as opposed to by shearing the plastic by mechanical force, the paper web 8 is not cut or torn by the die. Moreover, inasmuch as polyethylene has relatively low melting point, the die temperature required to cut the plastic is not great enough to either burn or char the paper web so that when the die ascends, at the end of the stamping operation, the paper web may be slightly embossed by the die, but is otherwise intact.

As best shown in FIGURE 3, if the cutting edge of the die is maintained at a proper temperature, it will not only cut the plastic into the desired shape, but will also seal the respective plastic sheets 4 and 6 together along the edges formed by that cutting action. It should be here emphasized that the spacing between the outlined glove 40 and the remainder of the plastic webs is distorted by being greatly enlarged in FIGURE 2, and that this is done merely for purposes of illustration, and that the total width of the cut or spacing between the glove and the remaining portions of the plastic webs is in practice only about one-hundredth of an inch.

Upon the subsequent intermittent movement of the power-driven rollers, the glove 40 defined in the plastic web moves to one or more intermediate positions and then to the lubricating station 14 where a hold-down device 42 descends and holds the glove firmly in position during the lubricating operation. The hold-down device is constructed and arranged to bear down upon the glove 40 along its edges but to remain free of all other portions, so that it does not interfere with the operation of a lubrication dispenser 44 (not shown in FIGURE 1) which then moves into the palm portion of the glove, between the respective plastic sheets from which the glove is formed, and then blows a lubricating material, such as talcum powder, into both the palm portion and the finger portions of the glove. After the lubrication dispenser has withdrawn from the glove 40, but not from between the portions of the plastic webs which are located between the lower ends of the sides of the glove, i.e., the line defining the wrist opening, and the nearest longitudinal edge of the plastic sheets, the composite web 4, 6 and 8 is advanced to the waste removal station 16.

A stationary knife 48, having its cutting edge facing the lubricating station 14, cuts the plastic, 4 and 6, and paper 8 webs along a longitudinally extending line which defines the wrist opening of the glove formed from the plastic webs. All of the waste plastic material, that is, the plastic material not defining the glove, and that portion of the paper web located on the opposite side of the cut made by the stationary knife from the glove, are drawn off to leave a paper web which is considerably narrower than that supplied to the machine, with finished gloves 40 resting thereon at spaced intervals. For convenience of operation, as well as in the interest of segregating the waste plastic from the waste paper so that the former may be recovered, the waste plastic and the waste paper are drawn off separately by pairs of waste removal rollers 50 and 52 which are located above the plane of feed rollers 26, 28, 30 and 32, as best shown in FIGURE 4. At least one of the rollers of each pair of waste removal rollers 50 and 52 is power-driven for rotation in synchronism with the power-driven rollers of the above mentioned feed rollers. As these power-driven rollers are also of the same diameter as the power-driven rollers of the feed rollers, the removal of the waste material keeps pace with the advance of the composite web into the waste removal section. The waste plastic and waste paper are deposited, by waste removal rollers 50 and 52, respectively, to waste hoppers 54 and 56, respectively.

The paper web, with the finished gloves spaced at intervals thereon, then moves to the web cutting station 18 where a transversely extending knife 57 descends to cut the paper web along a line intermediate the completed gloves lying thereon. It therefore follows that after the web cutting operation each glove is disposed upon a separate rectangular sheet of paper, which has a finished glove 40 disposed thereon, which slides down a chute 58 into a waiting hopper 60 which may be a portion of a conventional packing machine or from which the gloves may be removed and packed by hand.

With the above general explanation, the details of the structure and functions now to be fully described will now be easily understood.

The Feeding Station

It has been explained that the feeding station supplies two continuous webs of plastic sheet material to the stamping station. These two plastic webs can be drawn off two separate rolls of plastic sheet material or can be drawn off a single roll of plastic sheet material which is wound with a conventional double web, that is to say, a web formed of two entirely separate lengths of plastic sheet material.

In a preferred method of operation of this invention, plastic material is supplied from a single supply roll 71 which is wound with a single web of plastic doubled over to form, in effect, two webs, 4 and 6, of plastic material. It will be evident that the open edge of this double web should be on the side of the machine on which the lubrication dispenser is located, and that the closed edge should be on the opposite side, which is the side farthest from the viewer of the machine as it is illustrated in FIGURE 1. It has been found that the use of the single web doubled over lessens the likelihood of slippage between the respective layers of plastic, and hence reduces the likelihood of the machine becoming fouled during high speed operation.

The supply roll 71 of sheet plastic material is mounted for free rotation so that the intermittent rotational movement of the feed rollers 24 can easily pull the plastic sheet material from the roll. Inasmuch as a new supply roll of plastic material is fairly heavy, and thus develops a rather substantial inertia once it begins to rotate, a dancer 72 is interposed between the supply roll 71 and the feed rollers 24 to take up the slack in the plastic web produced by continued rotation of the supply roll during periods when the feed rollers 24 are idle, i.e., during a period when the elements of the stamping station 12, the lubricating station 14, and the web cutting station 18 are performing their respective functions upon the webs located in their respective zones.

The dancers 72 may be of any accepted construction, and in the embodiment illustrated include pairs of spaced parallel bars 73 pivoted at an intermediate point to a fixed bearing point 74. A transversely extending roller 75 is mounted with its end pivoted to the bars 73 at points adjacent their ends. The opposite ends of the bars 73 are attached to tension springs 76, which tend to rotate the bars in a direction causing the roller 75 to bear against the plastic web and thus maintain a tension therein which is regulatable by selection of the strength of the tension spring 76.

In FIGURE 1 the dancer 72 is illustrated in solid lines in the position which it will assume when the feed rollers 24 are unwinding the plastic web from the supply roll 71. The position the dancer 72 will assume during periods when the feed rollers 24 are idle is illustrated in phantom.

If it is preferred to use two separate plastic supply rolls, each containing a single ply web of plastic, a similar arrangement would be used in connection with each supply roll.

A paper supply roll 77 is mounted for free rotation in a manner similar to that of plastic supply roll 71 and a dancer 78, which may be structurally identical to dancer 72 but arranged to bear in a different direction, is used to keep the paper web properly taut. In FIGURE 1 the dancer 78 is illustrated in solid lines in the position it will assume when the feed rollers 24 are unwinding the paper web 8 from the supply roll 77. The position which the dancer 78 will assume during periods when the feed rollers 24 are idle is illustrated in phantom.

It should, of course, be understood that the specific location of the supply rolls 71 and 77 is purely a matter of choice and they may be placed in positions other than that illustrated in FIGURE 1, with their webs being arranged to pass through auxiliary idler feed rollers, as will be apparent to those skilled in the art.

The Stamping Station

Referring now to FIGURES 1, 5 and 6, the cutting and sealing assembly 38 includes a steel die 80 formed to the shape of the glove to be produced. The die illustrated in FIGURES 5 and 6 is formed to produce a glove similar to that illustrated in the copending application of Nathaniel C. Scott, Serial No. 612,546, which includes a separate finger pocket for the thumb, index and middle fingers but has a common pocket for the last two fingers, but it is within the contemplation of this invention that the die may be formed for producing other gloves having other configurations and with either more or less finger pockets than that illustrated in the above mentioned Scott application.

In this preferred embodiment, the steel die is formed from a length of steel rule material approximately 25 mils thick having its cutting edge generally rounded. As shown in FIGURE 7, the steel die is secured to a plate 82 formed of Transite, or some other heat-resistant substance which does not conduct electricity, by means of pins 84 which transversely extend through and radially outward from bolts 86, into apertures 87 in the die. These bolts 86 extend through apertures in plate 82 and are drawn tight by nuts 88 located in counterbores in the undersurface of the plate. The plate 82, with the die depending from its lower surface, is mounted, as by bolts 89, with its upper face contacting a hollow aluminum block 90 which is flushed with cooling water by water inlet tube 92 and water outlet tube 94.

As is shown in FIGURE 1, the cutting and sealing assembly 38 is mounted directly above backing plate assembly 36, which will be described in detail hereinafter, for vertical movement downward until the die 80 contacts the plastic webs resting on top of the die assembly and also for vertical movement upward until it is well clear of the plastic webs. This movement of the cutting and sealing assembly 38 may be obtained by any suitable mechanism which is suitably synchronized with the feed rollers 24, 26, 28, 30, 32 and 34 so that its downward movement occurs at a time when the plastic 4 and 6 and paper 8 webs are at rest. In the embodiment illustrated, this movement is obtained by pneumatic motors 96 (FIGURE 1) which are supplied with compressed air through hoses 98 and 100 at a proper time by conventional valve mechanism (not shown), but this movement could be equally satisfactorily obtained by any other conventional mechanical or electro-mechanical means.

At some time between each cutting and sealing operation, that is, between each period in which the die 80 is in its lowermost position, the cutting edges of the die are wiped by a roller 102 impregnated with a silicone grease, the latter serving to maintain a coating of the grease upon the cutting edges so as to prevent any adhesion between the plastic and the die. This roller may be mechanically motivated by mechanisms deriving their power from the movement of the cutting and sealing assembly or can be independently motivated, as in the embodiment here illustrated, by air motors 104 supplied with compressed air by hoses 106 and 108, at any selected time when the die is sufficiently clear of the plastic webs so as to preclude any interference between the roller 102 and the webs.

As has been explained hereinabove, the steel die is maintained at a temperature suitable for cutting the plastic by heat, as opposed to mechanical force, and to seal the edges of the cut in the plastic. It has been found that this temperature is in the range of 300 to 700° F. with the preferred temperature for high speed operation being approximately 550° F. This temperature in the die is obtained by attaching electric leads 110 and 112 to either end of the die and then subjecting it to an alternating current of 140 amperes at 4 volts, although other amperages and voltages may be used, depending upon the specific composition of the die and other factors.

The backing plate assembly 36 includes a flat planar element 116, which may be made of steel or some other rigid material, having a pad 118 of rubber, vinyl plastic, or other resilient material, thereupon. This plate is supported in position, by means of a large number of adjusting posts 124, above another plate 120 which is fixed on a solid foundation 122. As best shown in FIGURE 5, the ends of the adjusting posts are threadedly engaged with vertically aligned threaded apertures in plates 116 and 120 and each adjusting post has hexagonally formed intermediate sections so that it may be readily gripped by, and manipulated with, a conventional wrench, when the level of the plate 116 is being adjusted.

It will now be understood that the backing plate assembly 36 and the cutting and sealing assembly 38 must be so relatively adjusted that the entire cutting edge of the die 80 will, in its lowermost position and in the absence of any plastic webs thereunder, just touch the upper surface of the resilient pad 118. When the elements are so adjusted, and webs of plastic and paper are disposed upon the backing plate assembly, as has been described, the die 80 will descend to a level where its entire heated cutting edge will cut through the plastic and will press the paper web against the resilient pad 118, whereby that web may become slightly embossed.

The Lubrication Section

Referring now to FIGURES 8 and 9, it will be seen that at the lubrication station the edge portions of one longitudinal side of the plastic webs 4 and 6 part to pass around a lubricating dispenser 44. When the lubrication dispenser is not actively distributing lubricant, it rests in a position between the edges of the webs 4 and 6 and the line defining the wrist opening of the gloves 40 formed thereon. Thus, except for causing a parting of the edge portions of the plastic webs, it does not otherwise interfere with the regular intermediate longitudinal movement of the composite web 4, 6, 8.

The diameter of the power-driven rollers of the feed rollers is such that a glove formed by the stamping station 12 will come to rest, during one of the regular pauses of the composite web, at a position directly opposite the lubrication dispenser 44. When this occurs a hold-on device, generally indicated at 42 (FIGURES 8, 9, 10, 11 and 12) is motivated by pneumatic motor 45, or other suitable mechanical or electro-mechanical means, to descend to bear down upon the glove along all of the peripheral edges formed at that time, that is to say, along all of its outline except that of its as yet unformed wrist opening. The portion of the webs directly under the hold-down are supported upon table 43. The hold-down is so constructed and arranged, with depending side walls 130 formed to the outline of the glove being manufactured, that the upper plastic sheet of the formed glove 40 is free to stretch upwardly when the lubrication dispenser 44 moves into the palm portion of the glove. This result can be obtained if the height of the depending side walls 130 is greater than the greatest vertical dimension of the lubrication dispenser 44.

As best shown in the embodiment in FIGURES 8 and 11, the lubrication dispenser 44 consists of a metallic tube having its free end divided into four smaller metallic tubes separated one from the other. The free ends of the smaller metallic tubes are open and may be braced one to the other by braces 131. However, it must here be emphasized that the precise shape of the free end or head of the lubrication dispenser 44 may be considerably varied to obtain the optimum results with a particular glove having a particular configuration and the embodiment here shown is merely illustrative.

The important thing is that the head of the lubrication dispenser must be so shaped as to distribute the lubrication material into both the palm and finger portions of the interior of the particular glove being formed on the machine.

As shown in FIGURES 11 and 12, the lubrication dispenser is mounted for movement into the palm portion of a glove 40 when the latter is resting idle at the lubricating station. This movement can be obtained by any conventional mechanical or electro-mechanical means, and in the embodiment illustrated is obtained by attaching the dispenser to the piston rod 134 of a pneumatic motor 136 which is supplied with compressed air through hoses 138 and 140 at a proper time by conventional valve mechanisms (not shown).

When the dispenser has moved into the palm portion of the glove 40, and is in the position illustrated in FIGURES 10 and 11, talcum powder entrained in compressed air, by a conventional air-entrainer 142, is blown to the dispenser 44 through hose 132 and then out into the palm and finger portions of the glove 40. The distribution of the talcum continues as the dispenser 44 begins to move back to its regular position so that there is an adequate distribution of lubricating powder into the portions of the glove defining the wrist opening.

When the dispenser 44 has retracted to its normal position, that is to say to a position between the line defining the wrist opening of the glove 40 and the edges of the plastic webs 4 and 6, the lubricating step is completed and the webs are free to move on during the next period of intermittent rotation of the feed rollers. The pneumatic motor 136, or other motivating mechanisms employed, is arranged to insure the retraction of the dispenser 44 before this occurs.

The Web Cutting Station

Inasmuch as the waste removal station 16 has already been fully described, the details of the web cutting station 18 will now be explained.

Referring to FIGURES 1 and 13, the web cutting station includes a knife 57 extending transversely of the webs with the cutting edge of the blade directed downwardly. The ends of the knife are formed with longitudinally, of the knife, extending bosses 152 which loosely fit into vertically extending slots in upstanding columns 154 placed on either side of the path of the paper web 8. These slots together form a vertical course for movement of the knife 57. A piston rod 156 of a pneumatic motor 158, the latter being secured to a beam 160 extending between, and secured to, columns 154, is connected to the knife 57 at its midpoint so that operation of the pneumatic motor will raise or lower the knife.

The knife is so longitudinally, of the web, spaced from the other stations so that when the feed rollers are idle there is no glove 50 beneath the blade. That is to say, at that time the knife is disposed above a section of the paper web 8 which does not have a completed glove 40 resting thereon.

At that moment, that portion of the paper web is resting on a metal cutting edge 162 which extends transversely of the web along a line just off of (and towards the waste removal station) the longitudinal axis of the knife 57. When the blade descends it cooperates with the metal cutting edge 162 to shear the paper, by mechanical force. A rectangular section of the paper web 8, bearing a completed glove thereon, is then free to drop down chute 58 into the hopper 60, as is illustrated in FIGURE 1.

In this preferred embodiment of the invention, the plastic sheet metal used is 1¼ mil polyethylene although it is possible for this method to be performed, and this apparatus used, with polyethylene ranging in thickness from ½ mil to 10 or more mils and, as will be obvious, it is also possible to practice this method, and to use the apparatus hereinabove described, with other plastic sheet materials having characteristics similar to polyethylene.

It has been found that the best results can be obtained from the above described method and apparatus if the paper web 8 is 10 pound sulfite bond having a thickness of .002 inch although excellent results can also be obtained by using paper having a wide range of thicknesses. It is also possible to obtain excellent results using materials other than paper for the bottom web, the necessary functional characteristic being that the carrier web must be immuned to the heat of the cutting and sealing die 80 during the operation of the stamping station. Moreover, the material used for a bottom web must have a surface such that it will hold the finished glove during the procedures involved at the waste removal station 16 and the web cutting station 18, as well as during the following packaging operation, but will nevertheless be easily separated from the glove when the user wishes to don the latter.

Having described only a typical preferred form and application of the invention, I do not wish to be limited or restricted to specific details herein set forth, but wish to reserve to myself any variations or modifications that may appear to those skilled in the art and falling within the scope of the following claims.

I claim:

1. A method of manufacturing a disposable medical examining glove, from thermoplastic synthetic plastic sheet material, sealed at the free edges thereof to present a smooth edge seam approximately one one-hundredth of an inch wide including disposing a double web of plastic material upon a web of paper, stamping said double web of plastic material with a die shaped to the outline of the desired glove, said die being heated to a temperature above room temperature and sufficient to cut said plastic web into the shape of the die and to seal the edge of the cut made in the plastic, the temperature of the die being sufficiently low to avoid charring the paper web during its contact with the plastic web, and said stamping operation being controlled so as to avoid cutting the paper web.

2. A method of manufacturing a disposable medical examining glove, from thermoplastic synthetic plastic sheet material, sealed at the free edges thereof to present a smooth edge seam approximately one one-hundredth of an inch wide including disposing a double web of plastic material upon a web of paper, stamping said double web of plastic material with a die shaped to the outline of the desired glove, said die being heated to a temperature above room temperature and sufficient to cut said plastic web into the shape of the die and to seal the edge of the cut made in the plastic, the temperature of the die being sufficiently low to avoid charring the paper web during its contact with the plastic web, said stamping operation being controlled so as to avoid cutting the paper web, wiping said die with a release agent to prevent adhesion between the plastic material and the die at the moment the die is withdrawn from its contact with the plastic.

3. The method defined in claim 2 wherein the die is maintained at a temperature of between 300° F. and 700° F.

4. The method defined in claim 2 wherein the glove outlined by the heated die extends transversely of the web and is located intermediate the edges of the plastic web and that web is conveyed by said paper web to location where a glove lubricant is dispensed within the glove outlined, and the portion of the plastic web between the portion of the outlined glove defining a wrist opening and the nearest edge of the plastic web is then cut away to leave a finished glove having a wrist opening.

5. The method defined in claim 4 wherein the portions of the respective sheets of the plastic web between the line defining the wrist opening of the outlined glove and the nearest edge of the web are roved over and under, respectively, a glove lubricant dispenser mounted for movement transversely of the webs and into the palm portion of the outlined glove when the latter is positioned opposite thereto.

6. The method defined in claim 5 wherein the paper web, having a finished and lubricated glove disposed thereon, is cut into a rectangle with a finished glove resting thereon.

7. A method of manufacturing a disposable medical examining glove, from thermoplastic synthetic plastic sheet material, sealed at the free edges thereof to present a smooth edge seam approximately one one-hundredth of an inch wide including disposing a double web of plastic material upon a web of paper, transporting the plastic material and the underlying paper web to a stamping position, stamping said double web of plastic material with a heated die shaped to the outline of the desired glove, said die being heated to a temperature above room temperature and sufficient to cut said plastic web into the shape of the die and to seal the edge of the cut made in the plastic, the temperature of the die being sufficiently low to avoid charring the paper web during its contact with the plastic web, said stamping operation being controlled so as to avoid cutting the paper web, and transporting the portion of the plastic web having the glove outlined therein and the portion of the paper web underlying the outlined glove away from the stamping position and simultaneously transporting a new portion of the double plastic web, and a new portion of the underlying paper web, to the stamping position for the stamping of another outline of a desired glove.

8. A method of manufacturing a disposable medical examining glove, from thermoplastic synthetic plastic sheet material, sealed at the free edges thereof to present a smooth edge seam approximately one one-hundredth of an inch wide including disposing a double web of plastic material upon a web of paper, transporting the plastic material and the underlying paper web to a stamping position, stamping said double web of plastic material with a heated die shaped to the outline of the desired glove, said die being heated to a temperature above room temperature and sufficient to cut said plastic web into the shape of the die and to seal the edge of the cut made in the plastic, the temperature of the die being sufficiently low to avoid charring the paper web during its contact with the plastic web, said stamping operation being controlled so as to avoid perforating the paper web, wiping said die with a release agent to prevent adhesion between the plastic material and the die at the moment the die is withdrawn from its contact with the plastic, and transporting the portion of the plastic web having the glove outlined therein and the portion of the paper web underlying the outlined glove away from the stamping position and simultaneously transporting a new portion of the double plastic web, and a new portion of underlying paper web, to the stamping position for the stamping of another outline of a desired glove.

9. A method of manufacturing a disposable medical examining glove, from thermoplastic synthetic plastic sheet material, sealed at the free edges thereof to present a smooth edge seam approximately one one-hundredth of an inch wide including disposing a double web of plastic material upon a web of paper, transporting the plastic material and the underlying paper web to a stamping position, stamping said double web of plastic material with a heated die shaped to the outline of the desired glove, said die being heated to a temperature above room temperature and sufficient to cut said plastic web into the shape of the die and to seal the edge of the cut made in the plastic, the temperature of the die being sufficiently low to avoid charring the paper web during its contact with the plastic web, said stamping operation being controlled so as to avoid perforating the paper web, wiping said die with a release agent to prevent adhesion between the plastic material and the die at the moment the die is withdrawn from its contact with the plastic, and transporting the portion of the plastic web having the glove outlined therein and the portion of the paper web underlying the outlined glove away from the stamping position and simultaneously transporting a new portion of the double plastic web, and a new portion of underlying paper web, to the stamping position for the stamping of another outline of a desired glove, removing the portion of plastic surrounding the glove outlined therein from the glove, and transporting the glove upon the paper web to a terminal position.

10. Apparatus for manufacturing a disposable medical examining glove from thermoplastic synthetic plastic sheet material sealed at the free edges thereof to present a smooth edge seam approximately one one-hundredth of an inch wide including: means for bringing a double web of plastic material into planar contact with a web of paper with the plastic being disposed on top of the paper; a stamping station including downwardly disposed die means shaped into the outline of the desired glove for cutting and sealing the plastic web into the shape of a glove while leaving the paper web imperforate; said die means being heated above room temperature; means for lowering said die into contact with the plastic web and for raising said die clear of the plastic web after the same has been cut and sealed by the die; means for wiping said die with a release agent to prevent adhesion between the plastic and the die at the moment the die is raised from the plastic, said last mentioned means being operative during periods when the die is free of the plastic web.

11. The structure defined in claim 10 and further including a lubricating station defined by means for lubricating the glove outlined by said die, said means including a lubricating element mounted for movement into the palm portion of the outlined glove and means for causing said movement when an outlined glove presents the portions defining its wrist opening to said lubricating element.

12. The structure defined in claim 11 and further including a waste removal station including means for cutting the paper web and the plastic web along a line longitudinally thereof, said line being along the line defining the wrist opening of the glove formed in the plastic web, means for removing the portion of the plastic web between said line and the edge on the opposite side thereof from the outlined glove, and means for removing the portion of the paper web between said line and the edge on the opposite side thereof from the outlined glove.

13. The structure defined in claim 12 and further including a web cutting station including knife means for cutting the portion of the paper web having a finished and lubricated glove resting thereon along a line transversely of that web.

14. Apparatus for manufacturing a disposable medical examining glove from thermoplastic synthetic plastic sheet material sealed at the free edges thereof to present a smooth edge seam approximately one one-hundredth of an inch wide including: means for bringing a double web of plastic material into planar contact with a web of paper with the plastic being disposed on top of the paper; a stamping station including downwardly disposed die means shaped into the outline of the desired glove for cutting and sealing the plastic web into the shape of a glove while leaving the paper web imperforate; said die means being heated above room temperature; means for lowering said die into contact with the plastic web and for raising said die clear of the plastic web after the same has been cut and sealed by the die; means for wiping said die with a release agent to prevent adhesion between the plastic and the die at the moment the die is raised from the plastic, said last mentioned means being operative during periods when the die is free of the plastic web; and means for transporting the portion of the double plastic web having the glove outlined therein, together with the underlying portion of the paper web, away from said stamping station, and for simultaneously transporting a new portion of the double plastic web, and a new portion of the underlying paper web, to the stamping station.

15. Apparatus for manufacturing a disposable medical examining glove from thermoplastic synthetic plastic sheet material sealed at the free edges thereof to present a smooth edge seam approximately one one-hundredths of an inch wide including: means for bringing a double web of plastic material into planar contact with a web of paper with the plastic being disposed on top of the paper; a stamping station including downwardly disposed die means shaped into the outline of the desired glove for cutting and sealing the plastic web into the shape of a glove while leaving the paper web imperforate; said die means being heated above room temperature; means for lowering said die into contact with the plastic web and for raising said die clear of the plastic web after the same has been cut and sealed by the die; means for wiping said die with a release agent to prevent adhesion between the plastic and the die at the moment the die is raised from the plastic, said last mentioned means being operative during periods when the die is free of the plastic web; a waste removal station; means for transporting the portion of the double plastic web having a glove outlined therein, together with the underlying portion of the paper web, away from said stamping station and towards said waste removal station, and for simultaneously transporting a new portion of the double plastic web, and a new portion of the underlying paper web, to the stamping station; said waste removal station including means for cutting the paper web and the plastic web along the line defining the wrist opening of the glove formed in the plastic web, means for removing the portion of the plastic web between said line and the edge on the opposite side thereof from the outlined glove, and means for removing the portion of the paper web between said line and the edge on the opposite side thereof from the outlined glove.

16. Apparatus for manufacturing a disposable medical examining glove from thermoplastic synthetic plastic sheet material sealed at the free edges thereof to present a smooth edge seam approximately one one-hundredths of an inch wide including: means for bringing a double web of plastic material into planar contact with a web of paper with the plastic being disposed on top of the paper; a stamping station including downwardly disposed die means shaped into the outline of the desired glove for cutting and sealing the plastic web into the shape of a glove while leaving the paper web imperforate; said die means being heated above room temperature; means for lowering said die into contact with the plastic web and for raising said die clear of the plastic web after the same has been cut and sealed by the die; means for wiping said die with a release agent to prevent adhesion between the plastic and the die at the moment the die is raised from the plastic, said last mentioned means being operative during periods when the die is free of the plastic web; and means for transporting the portion of the double plastic web having the glove outlined therein, together with the underlying portion of the paper web, away from said stamping station, and for simultaneously transporting a new portion of the double plastic web, and a new portion of the underlying paper web, to the stamping station; means for removing the portion of plastic surrounding the glove outlined in the plastic from the glove; a terminal position; and means for transporting the finished glove upon the paper web to said terminal position.

17. A method of manufacturing an article from synthetic thermoplastic sheet material, sealed at the free edges thereof to present a smooth edge seam including disposing a double web of plastic material upon a web of paper, stamping said double web of plastic material with a die shaped to the outline of the desired article, said die being heated to a temperature above room temperature and sufficient to cut said plastic web into the shape of the die and to seal the edge of the cut made in the plastic, the temperature of the die being sufficiently low to avoid charring the paper web, and said stamping operation being controlled so as to avoid cutting the paper web.

References Cited in the file of this patent

UNITED STATES PATENTS

| | | |
|---|---|---|
| 222,345 | Carr | Dec. 9, 1879 |
| 1,625,394 | Roberts | Apr. 19, 1927 |
| 2,526,634 | Chavannes | Oct. 24, 1950 |
| 2,614,953 | Anglada | Oct. 21, 1952 |
| 2,710,046 | Markus | June 7, 1955 |
| 2,917,842 | Scholl | Dec. 22, 1959 |
| 3,007,835 | Rosenberg et al. | Nov. 7, 1961 |

FOREIGN PATENTS

| | | |
|---|---|---|
| 511,535 | Italy | Jan. 26, 1955 |